United States Patent
LaPointe

(10) Patent No.: US 6,862,777 B2
(45) Date of Patent: Mar. 8, 2005

(54) OIL-LESS RIVET SYSTEM FOR A RECLINING CHAIR MECHANISM

(75) Inventor: Larry P. LaPointe, Temperance, MI (US)

(73) Assignee: La-Z-Boy Incorporated, Monroe, MI (US)

( * ) Notice: Subject to any disclaimer, the term of this patent is extended or adjusted under 35 U.S.C. 154(b) by 0 days.

(21) Appl. No.: 10/196,898

(22) Filed: Jul. 16, 2002

(65) Prior Publication Data

US 2004/0012241 A1 Jan. 22, 2004

(51) Int. Cl.$^7$ .............................................. E05D 11/00
(52) U.S. Cl. .......................................... 16/221; 16/273
(58) Field of Search .................. 16/221, 273; 411/531, 411/532–547, 428, 404–409

(56) References Cited

U.S. PATENT DOCUMENTS

| | | | |
|---|---|---|---|
| 3,670,092 A | 6/1972 | Updyke et al. | 174/152 R |
| 3,736,394 A * | 5/1973 | Rumbaugh | 200/572 |
| 3,939,529 A * | 2/1976 | Davis | 16/249 |
| 3,953,817 A | 4/1976 | Covert | 337/136 |
| 4,050,771 A | 9/1977 | Watson et al. | 339/263 R |
| 4,363,580 A | 12/1982 | Bell | 411/15 |
| 4,388,744 A * | 6/1983 | Pantke et al. | 16/273 |
| 4,863,329 A | 9/1989 | Wilson | 411/339 |
| 4,921,371 A | 5/1990 | Boiraeu et al. | 403/408.1 |
| 4,958,970 A * | 9/1990 | Rose et al. | 411/12 |
| 5,104,190 A * | 4/1992 | Siegrist | 297/362 |
| 5,147,151 A * | 9/1992 | Hipkins, Jr. | 405/259.1 |
| 5,397,206 A | 3/1995 | Sihon | 411/544 |
| 5,450,141 A * | 9/1995 | Kobayashi | 351/110 |
| 5,562,377 A * | 10/1996 | Giannuzzi et al. | 411/82 |
| 5,570,927 A | 11/1996 | LaPointe et al. | 297/85 |
| 5,704,752 A | 1/1998 | Logerot | 411/503 |
| 5,735,021 A * | 4/1998 | Briggs | 16/369 |
| 5,812,095 A | 9/1998 | Adrian et al. | 343/713 |
| 5,860,780 A * | 1/1999 | Lenac et al. | 411/501 |
| 5,906,029 A * | 5/1999 | Fox | 16/386 |
| 6,194,675 B1 | 2/2001 | Greer | 200/50.32 |
| 6,435,791 B1 | 8/2002 | Bydalek | 411/428 |
| 6,607,328 B1 | 8/2003 | Treiber et al. | 403/408.1 |

* cited by examiner

Primary Examiner—John B. Walsh
(74) Attorney, Agent, or Firm—Harness, Dickey & Pierce, P.L.C.

(57) ABSTRACT

An improved rivet system is disclosed. A wall proximity reclining/tilt chair includes the improved rivet system which eliminates the need for oil lubrication and additional bushings. The rivet system is such that installation is simplified and manufacturing inconsistencies are reduced. In this manner, the rivet system can be installed with less need for quality control confirmations.

7 Claims, 6 Drawing Sheets

OIL-LESS RIVET SYSTEM FOR A RECLINING CHAIR MECHANISM

CROSS-REFERENCE TO RELATED APPLICATIONS

FIELD OF THE INVENTION

The present invention relates generally to reclining chairs and, more particularly, to rivets that are used as pivot points such as to allow the chair frame to recline and to extend the legrest of a reclining chair.

Traditionally, reclining chairs are equipped with an actuation mechanism which is operatively interconnected between a prefabricated chair frame and a stationary base assembly. The actuation mechanism is typically a combination of various mechanical linkages operable for providing various comfort features such as independent reclining movement of a seat assembly as well as actuation of an extensible leg rest assembly and associated tilting of the chair frame. Rivet joints are the primary means utilized to fabricate the pivots in these various mechanical linkages. The rivets securely couple the connecting links while allowing a smooth pivoting motion.

While many conventional reclining chairs operate satisfactorily, furniture manufacturers are continually striving to develop improved actuation mechanisms for reducing system complexity and increasing structural soundness and smoothness of operation. Furthermore, there is a continuing desire to develop improved rivet systems which will result in reduced costs while promoting increased efficiency and improved product quality.

SUMMARY OF THE INVENTION

In accordance with the principles of the present invention, an improved rivet system is disclosed which does not require lubricating oil, which is more simple and less costly to assemble and which reduces manufacturing inconsistencies when compared to conventional rivet systems. The improved rivet system is readily adaptable for use with conventional actuation mechanisms.

In accordance with a preferred embodiment, a wall proximity reclining chair is provided to include the improved rivet system that replaces existing rivets. Additional objects, advantages, and features of the present invention will become apparent from the following description taken in conjunction with the accompanying drawings.

DETAILED DESCRIPTION OF THE INVENTION

In accordance with the teachings of the present invention, an improved rivet system for use in single and multi-person articles of furniture (i.e. chairs and sofas or loveseats) is disclosed. A general understanding of the art to which the present invention pertains is disclosed in U.S. Pat. No. 5,570,927n which is commonly owned by the assignee of the present invention and the disclosure of which is expressly incorporated by reference herein. As will be described, the rivet system utilizes a friction reducing bushing that does not require lubricating oil.

Figure 1:
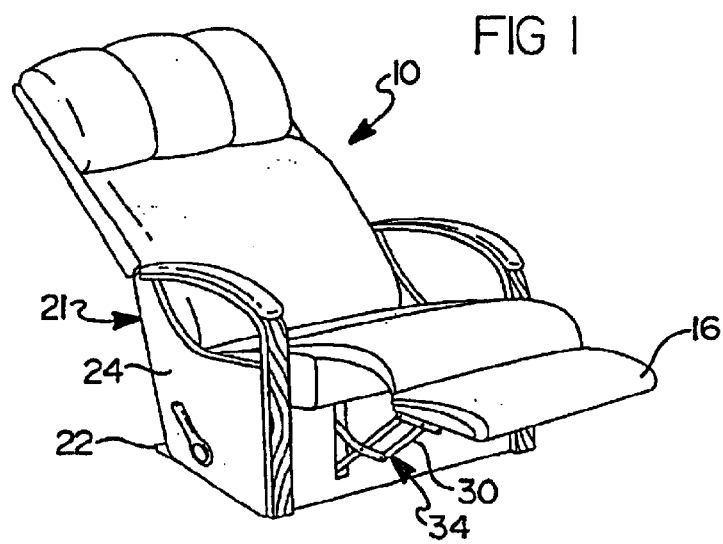
FIG. 1 is a perspective view of a wall proximity reclining/tilt chair in accordance with the present invention.

With reference to FIG. 1, the article of furniture shown is a combination wall proximity recliner and tilt chair, hereinafter referred to wall proximity reclining/tilt chair 10, which includes a pre-assembled actuation mechanism 12.

Figure 2:
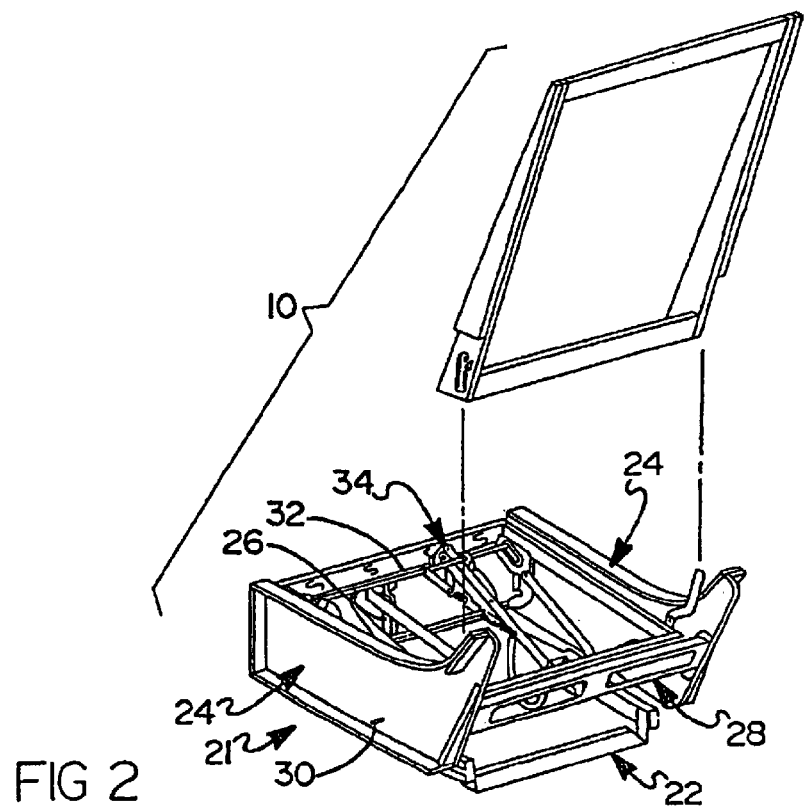
FIG. 2 is a perspective view of the internal frame of the wall proximity reclining/tilt chair shown in FIG. 1.

As best seen in FIG. 2, actuation mechanism 12 of wall proximity reclining/tilt chair 10 is integrated into and operably suspended from chair frame 21 and, in particular, from left and right side frame assemblies 24. In addition to side frame assemblies 24, chair 10 also includes a front rail assembly 26 and a rear rail 28 which, when interconnected, define a rigid "box-like" chair frame. Preferably, most of the structural frame components including side frame assemblies 24, front rail assembly 26 and rear rail 28 are each constructed in a manner which enables them to support springs, padding, upholstery, etc. in order to complete a decorative and stylish reclining/tilt chair 10. More preferably, each of these frame components, except for front rail assembly 26 and rear rail 28, are fabricated from one or more wood panels and/or rails that are fixedly secured together by suitable fasteners, such as dowels, staples, nails and screws, and which may be reinforced at critical joints by metal reinforcement plates or brackets and/or wood corner blocks in a known manner. As previously noted, each frame component is individually pre-assembled for subsequent modular assembly into wall proximity reclining/tilt chair 10. However, it is to be understood that the specific construction shown for each frame component is merely exemplary in nature.

Figure 3:
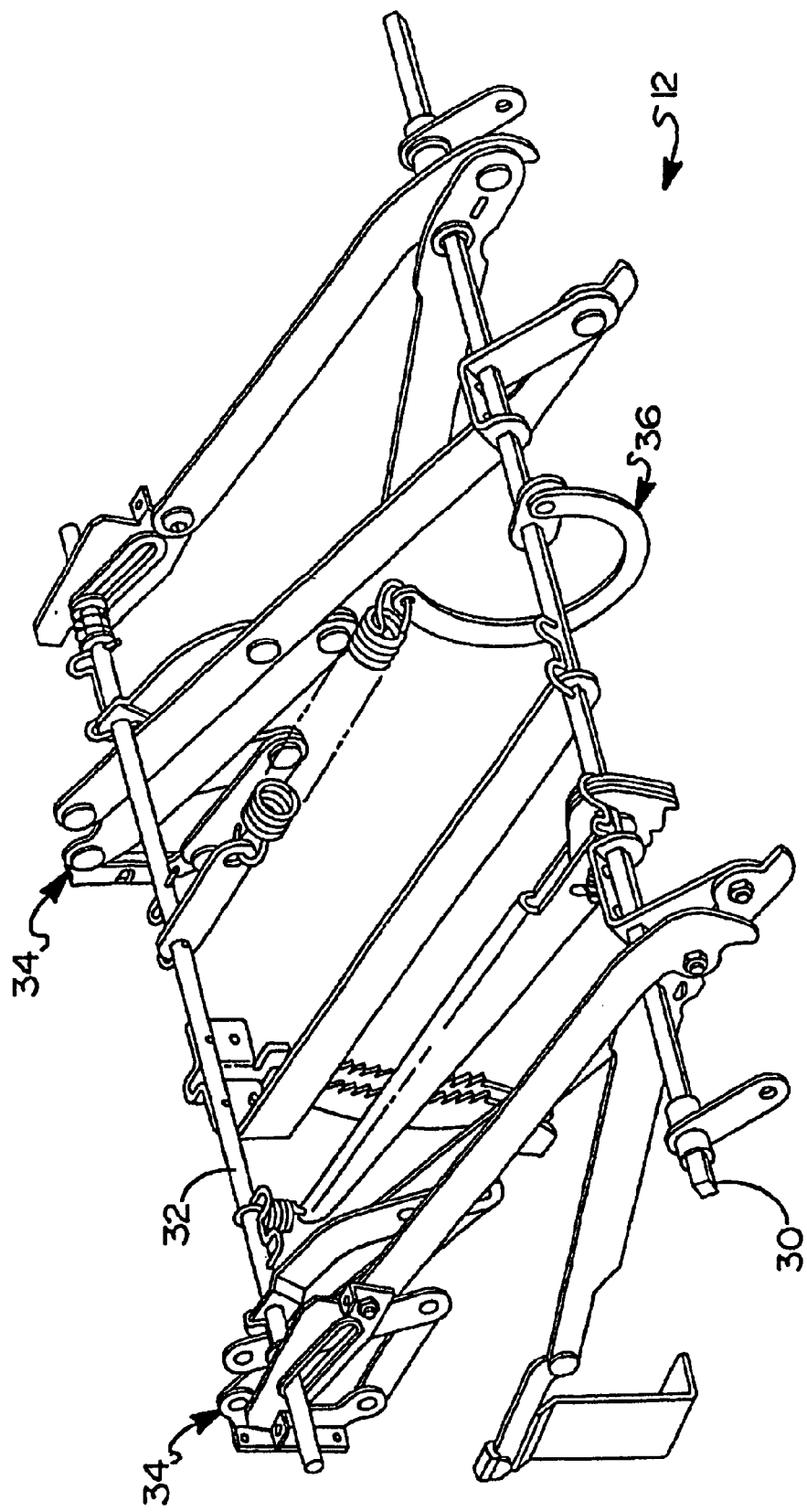
FIG. 3 is an enlarged perspective view of the actuation mechanism shown in FIG. 2.

With reference to FIGS. 2 and 3, actuation mechanism 12 is shown to include a drive rod 30 and front support shaft 32, both of which are spatially oriented to be precisely located and "suspended" from left and right side frame assemblies 24. In the preferred construction, drive rod 30 is an elongated square shaft having a manually-operable handle (not shown) secured thereto adjacent an upholstered exterior portion of one of side frame assemblies 24 and which can be easily reached by a person seated in chair 10 for convenient actuation thereof. In addition, leg rest assembly 16, as shown in FIG. 1, is supported for extensible movement on actuation mechanism 12. More specifically, leg rest assembly 16 includes left and right pantograph linkage mechanisms 34 which is operable associated with drive rod 30 and front support shaft 32 for permitting the seat occupant to selectively actuate leg rest assembly 16 to response to rotation of drive rod 30 via the handle.

Figure 4:
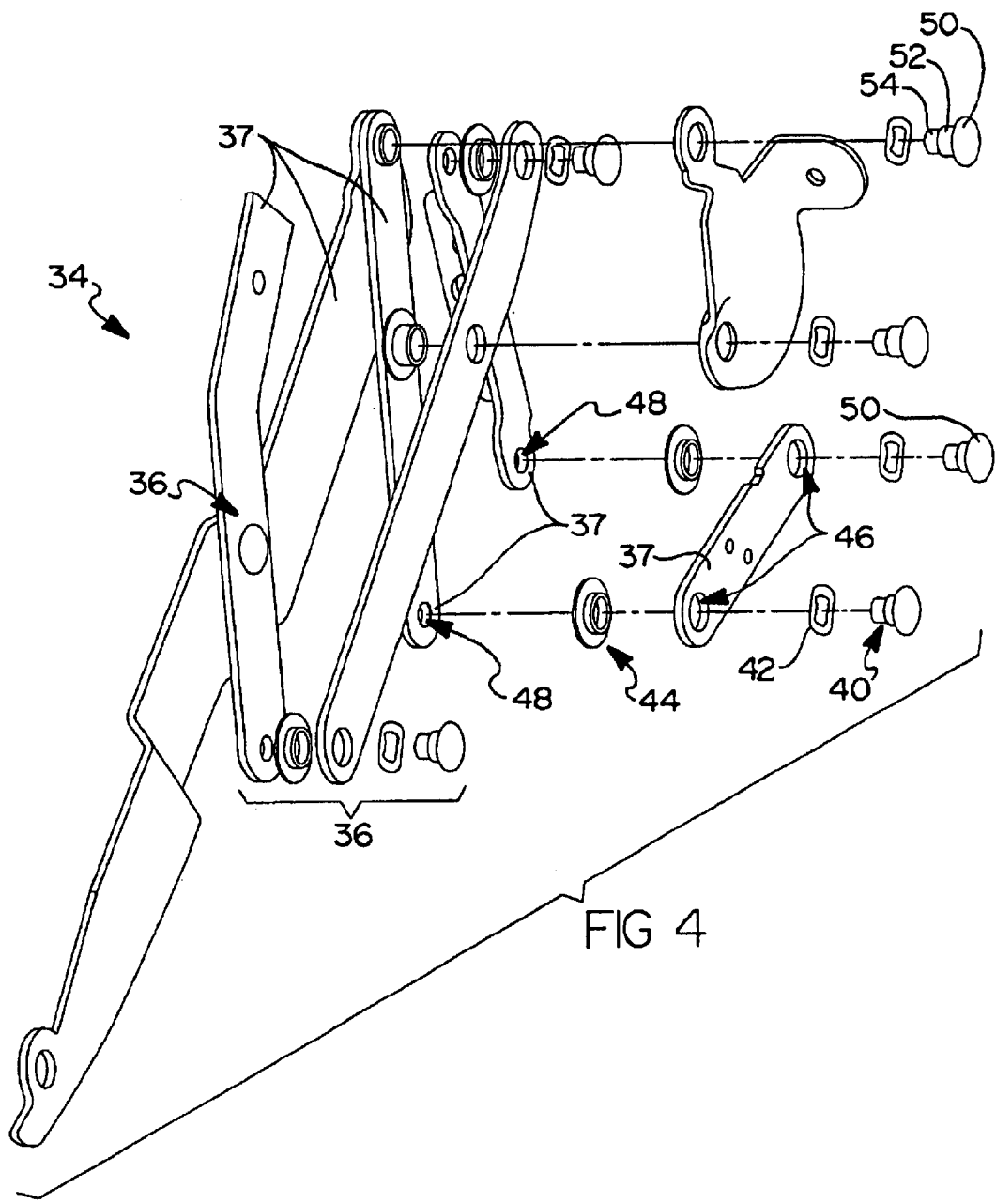
FIG. 4 is an exploded prospective view of a pantograph linkage mechanism shown in FIG. 2 illustrating the improved rivet both partially and fully assembled.
Figure 5:
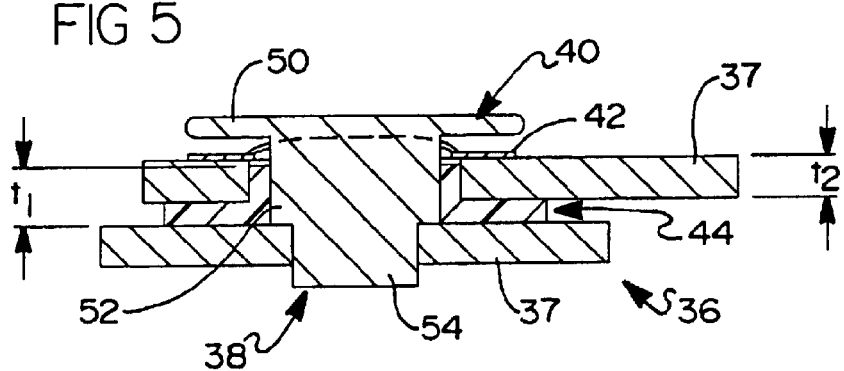
FIG. 5 is an enlarged view of the improved rivet system, fully assembled.
Figure 6:
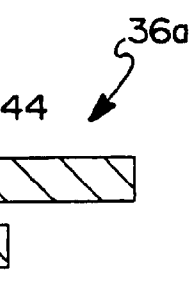
FIG. 6 is an enlarged view of a conventional rivet system fully assembled.

Referring to FIGS. 4 and 5, pantograph linkage mechanisms 34 are assembled with rivet joints 36 and connecting links 37. These joints utilize an oil-less rivet system 38 which allows the connecting links 37 of pantograph linkage mechanism 34 to pivot about a pivot axis. These relative rotations of the connecting links 37 are constrained by the dynamics of the multi-bar linkage design. Rivet system 38 is comprised of rivet 40, wave washer 42, and shoulder bushing 44. Rivet joint 36 is comprised of rivet system 38, a larger linkage connection hole 46 of a connecting link 37 and a smaller linkage connection hole 48 of a connecting link 37. Rivet 40 is of unitary construction comprising rivet head 50, rivet shoulder 52, and tenon 54. With reference to FIG. 6, a prior art rivet joint 36a is shown that includes fiber washer 144 interposed between connecting links 37a, 37b.

Figure 7:
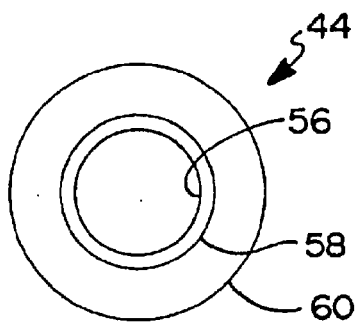
FIG. 7 is a detailed plan view of the shoulder bushing shown in FIG. 5.
Figure 8:
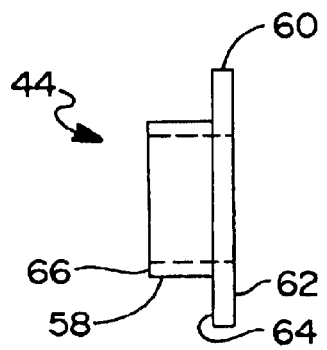
FIG. 8 is a detailed side view of the shoulder bushing shown in FIG. 5.

As shown in FIGS. 7 and 8, shoulder bushing 44 is a unitary construction defined by shoulder bushing inner diameter 56, shoulder bushing outer diameter 58, washer outer diameter 60, washer outer face 62, washer inner face 64, and bushing inner face 66. As shown in FIGS. 4 and 5, shoulder bushing inner diameter 56 rotatably engages rivet shoulder 52. Shoulder bushing outer diameter 58 rotatably engages the larger linkage connection hole 46 of connecting link 37. Smaller linkage connection hole 48 of connecting link 37 is sized to fit tenon 54. The thickness $t_1$ of shoulder bushing outer diameter 58 is less than the thickness $t_2$ of the associated connecting link 37 to allow wave washer 42 to fully engage connecting link 37. As best depicted in FIG. 4, rivet joint 36 may contain a third connecting link 37 by utilizing a rivet 40 with either a longer rivet shoulder 52 or longer tenon 54. With reference to FIGS. 4 and 5, rivet system 38 is assembled with a conventional riveting peening method applied to tenon 54.

Shoulder bushing 44 replaces a conventional oiled fiber washer 144 (as shown in FIG. 6) which functioned as an oil reservoir in a conventional rivet joint. In the conventional system, the rivet joint is assembled and painted using an electrostatic painting process. The fiber washer was then soaked with oil. The conventional system has a shortcoming in that the fiber washer requires lubrication after assembly and painting.

The improved shoulder bushing 44 is constructed of material that is low-friction and self-lubricating when installed between metal connecting links 37, thus eliminating undersired manufacturing inconsistencies. As a preferred embodiment, the shoulder bushing 44 is fabricated of nylon 6/6. However, a skilled practitioner will recognize that other suitable low-friction self-lubricating plastics may be utilized in the present invention. Rivet shoulder 52 extends through link 37a and shoulder bushing 44 to provide a metal-to-metal contacts between the rivet 40 and the link 37b. Thus, good electrical conductivity to the links 37a, 37b is provided by the rivet 40 and the wave washer 42 to promote efficient electrostatic painting.

Some conventional rivet systems, as shown in FIG. 6, utilize a bushing that faces the rivet head and floats between the rivet shoulder and first linkage connection hole to reduce rotational friction. The improved shoulder bushing 44 combines this bushing (if installed) and fiber washer in a one-piece construction to reduce the number of parts required for assembly. Moreover, the link 37a and the shoulder bushing 44 are permitted to slide axially on the rivet shoulder 52 which in combination with the wave washer 42 affords greater latitude for dimensional tolerance of the rivet joint 36.

Wave washer 42 provides an axial spring force within rivet joint 36 to prevent wobble of the joint while concomitantly allowing for tolerance variations in link 37a thickness. The metal construction of wave washer 42 provides an electrical circuit throughout pantograph linkage mechanism 34 which simplifies post-assembly electrostatic painting. As presently preferred, the wave washer is fabricated of a spring steel washer that is plastically deformed to provide the desired force when assembled. However, a skilled practitioner will recognize that other suitable materials and designs may be utilized in the present invention.

Figure 9:
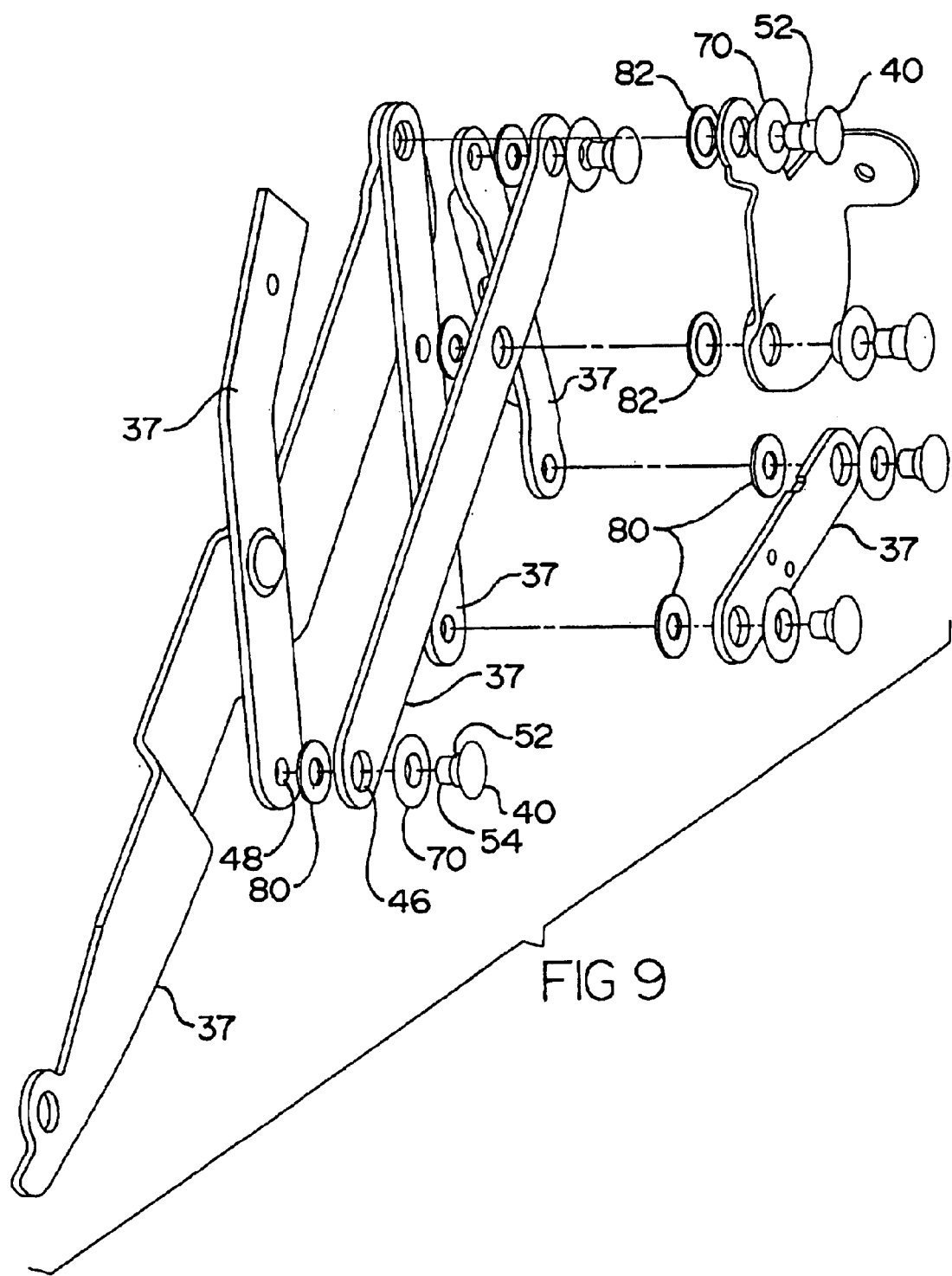
FIG. 9 is an exploded prospective view of a pantograph linkage mechanism incorporating an alternate embodiment of the improved rivet system of FIG. 5.
Figure 10A:
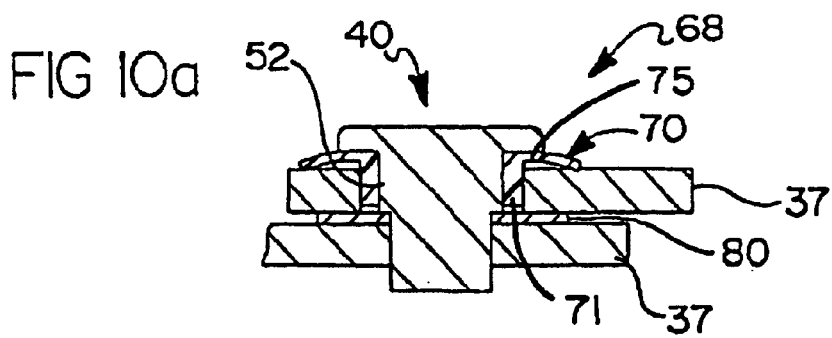
FIGS. 10a and 10b are enlarged views of an alternate embodiment of the improved rivet system of FIG. 5.
Figure 11:
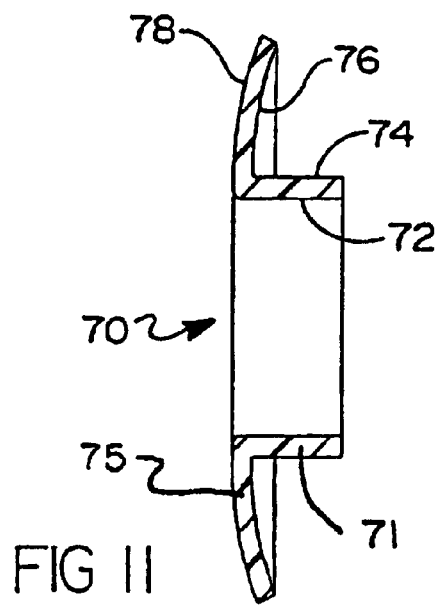
FIG. 11 is a sectional view of a spring shoulder bushing of the improved rivet system of FIG. 10.

With reference to FIGS. 9 and 10a, rivet joint 68 is shown as an alternate embodiment of rivet joint 36 wherein rivet shoulder 52 of rivet 40 is received within a spring shoulder bushing 70. As best seen in FIG. 11, spring shoulder bushing 70 is of unitary construction and includes bushing inner surface 72, a bushing outer surface 74, a washer inner surface 76 and a washer outer surface 78. The washer portion of spring shoulder busing 70 is dished with washer inner surface 76 forming a concavity. Spring shoulder bushing 70 is preferably constructed of a self-lubricating plastic and more preferably of nylon.

Spring shoulder bushing 70 is received within a larger linkage connection hole 46 of a connecting link 37 where bushing outer surface 74 and at least a portion of washer inner surface 76 are in contact with connecting link 37. Rivet tenon 54 is received within a thrust washer 80 which is interposed between connecting links 37. Thrust washer 80 is preferably constructed of bronze or zinc plated steel to reduce rotational friction between connecting links 37 and provide an electrical circuit connection between the connecting links 37. Tenon 54 is also received within smaller linkage connection hole 48 of a connecting link 37. A conventional riveting/peening process is used to assemble rivet joint 68. When rivet joint 68 is fully assembled, thrust washer 80 is preferably in contact with rivet shoulder 52. Spring shoulder bushing 70 applies an axial force acting circumferentially on rivet head 50 and connecting link 37 to reduce any wobble associated with rivet joint 68.

Figure 10B:
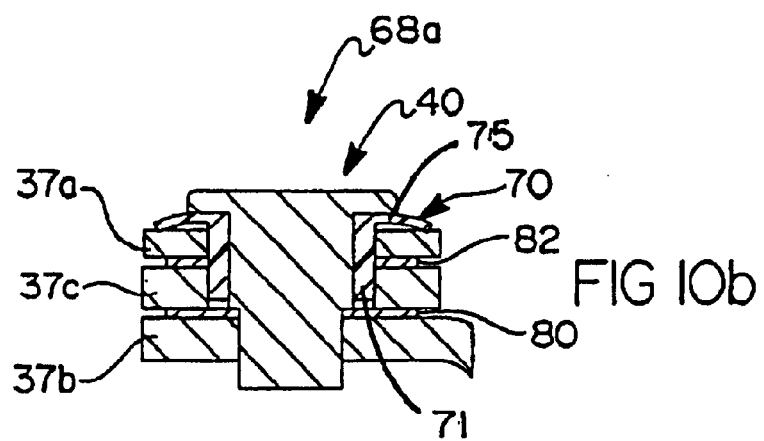

FIG. 10b discloses rivet joint 68a, essentially similar in construction as rivet joint 68 and including a third connecting link 37c with a larger linkage hole 46 interposed between connecting links 37a, 37b. A larger bore thrust washer 82 is interposed between links 37a and 37c to allow the three links 37a, 37b, 37c to freely rotate. The bushing portion of spring shoulder bushing 70 in rivet joint 68a preferably has a greater axial length than the bushing portion of spring shoulder bushing 70 in rivet joint 68. In this manner, larger linkage hole 46 of third connecting link 37c can contact the bushing outer surface 74 which provides for a low friction joint with reduced wobble.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A rivet system of the type having a rivet pivotally coupling a first connecting link and a second connecting link, the improvement comprising:

a metal rivet having an enlarged head portion and a shank portion having a shoulder portion adjacent to said head portion and a tenon portion, said shank portion received within apertures formed through said first and second connecting links;

a wave washer interposed between said enlarged head portion and said first connecting link on said shank portion to exert an axial force between said head portion of said rivet and said first connecting link; and a bushing having a washer portion interposed between said first connecting link and said second connecting link on said shank portion and a shoulder portion received within said aperture formed in said first connecting link, said shoulder portion of said bushing having a continuous inner diameter and permitting axial translation of said bushing relative to said shoulder portion of said rivet, said bushing being fabricated of a low friction plastic material.

2. The rivet system of claim 1 wherein said bushing is a nylon bushing.

3. The rivet system of claim 1 wherein a face of said shoulder portion of said rivet shank is in contact with said second connecting link.

4. A rivet system of the type having a rivet pivotally coupling a first connecting link and a second connecting link, the improvement comprising:

a metal rivet having an enlarged head portion and a shank portion having a shoulder portion adjacent to said head portion and a tenon portion, said shank portion received within apertures formed through said first and second connecting links;

a first thrust washer received on said tenon portion interposed between said first connecting link and said second connecting link, a spring bushing received on said shank portion having a washer portion interposed between said first connecting link and said enlarged head portion, and a shoulder portion received within said aperture formed in said first connecting link, said bushing being fabricated of a low friction plastic material, said spring bushing adapted to bias said first connecting link away from said enlarged head portion, said first connecting link moveable toward said enlarged head portion to overcome said bias along an axis defined by said first connecting link aperture.

5. The rivet system of claim 4, wherein said first thrust washer is a metallic thrust washer.

6. The rivet system of claim 4, wherein said spring bushing is a nylon bushing.

7. A rivet system of the type having a rivet pivotally coupling a first connecting link, a second connecting link and a third connecting link, the improvement comprising:

a metal rivet having an enlarged head portion and a shank portion having a shoulder portion adjacent to said head portion and a tenon portion, said shank portion received within apertures formed through said first, second and third connecting links;

a first thrust washer received on said tenon portion interposed between said first connecting link and said second connecting link;

a second thrust washer received on said shoulder portion interposed between said first connecting link and said third connecting link;

a spring bushing received on said shank portion having a washer portion interposed between said first connecting link and said enlarged head portion, and a shoulder portion received within said aperture formed in said first and third connecting links, said bushing being fabricated of a low friction plastic material, said spring bushing adapted to bias said first connecting link away from said enlarged head portion, said first connecting link moveable toward said enlarged head portion to overcome said bias along an axis defined by said first connecting link aperture.

* * * * *

UNITED STATES PATENT AND TRADEMARK OFFICE
CERTIFICATE OF CORRECTION

PATENT NO. : 6,862,777 B2
DATED : March 8, 2005
INVENTOR(S) : Larry P. LaPointe

It is certified that error appears in the above-identified patent and that said Letters Patent is hereby corrected as shown below:

Title page,
Item [57], ABSTRACT, delete:
"An improved rivet system is disclosed. A wall proximity reclining/tilt chair includes the improved rivet system which eliminates the need for oil lubrication and additional bushings. The rivet system is such that installation is simplified and manufacturing inconsistencies are reduced. In this manner, the rivet system can be installed with less need for quality control confirmations". and insert:
-- A rivet system for pivotally coupling a set of links in a wall proximity reclining/tilt chair which eliminates the need for oil lubrication and additional bushings. The rivet system includes a metal rivet, a first thrust washer received on a tenon of the metal rivet and interposed between a pair of connecting links and a spring bushing received on a shank portion of the rivet and interposed between one of the connecting links and an enlarged head formed on the rivet. The rivet system is such that installation is simplified and manufacturing inconsistencies are reduced. In the manner, the rivet system can be installed with less need for quality control confirmations. --.

Column 1,
Lines 5-6, delete "CROSS-REFERENCE TO RELATED APPLICATIONS".
Line 12, "legrest" should be -- leg rest --.

Column 2,
Line 18, "5,570,927n" should be -- 5,570,927 --.
Line 64, "operable" should be -- operably --.
Line 66, first occurrence of "to" should be -- in --.

Column 3,
Line 45, "undersired" should be -- undesired --.

UNITED STATES PATENT AND TRADEMARK OFFICE
CERTIFICATE OF CORRECTION

PATENT NO. : 6,862,777 B2
DATED : March 8, 2005
INVENTOR(S) : Larry P. LaPointe

It is certified that error appears in the above-identified patent and that said Letters Patent is hereby corrected as shown below:

Column 4,
Line 16, "busing" should be -- bushing --.

Signed and Sealed this

Twenty-eighth Day of June, 2005

JON W. DUDAS
*Director of the United States Patent and Trademark Office*